US005712997A

United States Patent [19]

Dice

[11] Patent Number: 5,712,997
[45] Date of Patent: Jan. 27, 1998

[54] SYSTEM AND METHOD FOR PROCESSING LOAD INSTRUCTION IN ACCORDANCE WITH "NO-FAULT" PROCESSING FACILITY INCLUDING ARRANGEMENT FOR PRESERVING ACCESS FAULT INDICIA

[75] Inventor: David Dice, Foxboro, Mass.

[73] Assignee: Sun Microsystems, Inc, Mountain View, Calif.

[21] Appl. No.: 594,594

[22] Filed: Jan. 31, 1996

[51] Int. Cl.$^6$ .................................................. G06F 9/30
[52] U.S. Cl. .................................... 395/393; 395/392
[58] Field of Search ................................ 395/392, 393

[56] References Cited

U.S. PATENT DOCUMENTS 5,452,426  9/1995  Papworth et al. ...................... 395/393
5,628,021  5/1997  Iadonato et al. ........................ 395/800

OTHER PUBLICATIONS

Smith; "Implementing Precise Interrupts in pipelined Processors" IEEE Transactions on Computers, vol. 37, No. 25, May 1988 pp. 562–573.

*Primary Examiner*—Krisna Lim
*Attorney, Agent, or Firm*—Richard A. Jordan

[57] ABSTRACT

A microprocessor in a computer system processes an instruction stream comprising instructions of a plurality of instruction types including an information retrieval instruction type. The microprocessor comprises a register set, a pending fault flag set, a functional unit, an information retrieval subsystem, and a control subsystem. The register set comprises a plurality of registers, each register for storing information. The pending fault flag set comprises a plurality of pending fault flags each associated with one of said registers, each pending fault flag having selected conditions including a pending fault condition and a no pending fault condition. The functional unit performs processing operations in response to information input thereto. The information retrieval subsystem initiates an information retrieval operation to retrieve of information from said information storage subsystem for storage in a register. The control subsystem controls the other elements of the microprocessor in response to the instructions in the instruction stream. In response to an instruction in the instruction stream of the information retrieval type, the control subsystem enables the information retrieval subsystem to initiate an information retrieval operation, and conditions the pending fault flag associated with said one of said registers to the pending fault condition in response to detection of a fault condition during the information retrieval operation. In response to an instruction in the instruction stream of another type, the control subsystem identifies a selected one of said registers as a source register, and enables information to be transferred from said source register to the functional unit for processing if the pending fault flag associated with said source register is in the no pending fault condition.

32 Claims, 3 Drawing Sheets

SYSTEM AND METHOD FOR PROCESSING LOAD INSTRUCTION IN ACCORDANCE WITH "NO-FAULT" PROCESSING FACILITY INCLUDING ARRANGEMENT FOR PRESERVING ACCESS FAULT INDICIA

FIELD OF THE INVENTION

The invention relates generally to the field of digital computers, and more specifically to a system and method for processing a load instruction in accordance with a "no-fault" processing facility which provides an arrangement for preserving access fault indicia indicating whether an access fault occurs during processing of the load instruction. The preserved indicia may be used later, for example, to determine whether a fault handler is to be called if the information that was to be retrieved in response to the no-fault load instruction is to be used in processing of a subsequent instruction.

BACKGROUND OF THE INVENTION

Digital computers process a variety of diverse types of programs, with each program including a series of instructions that enable the processor to perform specific operations in connection with specific elements of data. Typically, particularly in microprocessors designed according to the "RISC" (reduced instruction set computer) architectural model, data to be processed is transferred from, for example, external memory and/or input/output devices, to internal registers. The data in the registers is processed and the processed data is thereafter stored in the registers. At some point, the processed data may be transferred from the registers to the external memory and/or input/output devices for storage or to control the input/output devices. Conventionally in microprocessors designed according to the RISC model, data is transferred between the registers and the external memory and input/output devices using load/store instructions, in particular "load" instructions to load data from the external memory and input/output devices into the microprocessor's registers, and "store" instructions to transfer data in the microprocessor's registers to the external memory and input/output devices for storage. Other instructions, illustratively processing instructions, are used to process the data in the microprocessor's registers.

In performing an external access (that is, a load or store operation in connection with the external memory or the input/output devices) typically a memory management unit will perform checking operations to verify, for example, that the address used to identify the storage location in the external memory or input/output device is a valid address (that is, if the address is within a range of addresses accessible by the program), and that the program attempting to perform the access operation has the right to perform the access operation. Generally, with load instructions, if the memory management unit detects an access violation, which may occur if, for example, the address is invalid or if the program does not have the right to perform the access operation in connection with the location, the memory management unit will provide an "access fault" indication to the microprocessor. The operating system typically maintains a fault handler which, if an access fault is indicated, will typically be called by the microprocessor to, for example, determine the cause of the fault and whether it can be corrected. If the fault handler determines that the fault can be corrected, it may also correct the fault and allow the microprocessor to continue processing the program which issued the faulting instruction. On the other hand, if the fault handler determines that the fault cannot be corrected, the microprocessor may terminate processing of the program which issued the faulting instruction.

Recently, microprocessors have been developed which include "no-fault" facility for use in connection with load instructions to provide some enhanced flexibility in connection with ordering of instructions in a program. Microprocessors which provide a "no-fault" load facility include, for example, those constructed in accordance with the SPARC Version 9 architecture described in SPARC International, Inc [David L. Weaver and Tom Germond (eds)], *The SPARC Architecture Manual Version 9* (Prentice-Hall, 1994) (hereinafter referred to as "the SPARC Architecture Manual, Version 9"). During processing of a load instruction in connection with the "no-fault" facility, if the memory management unit detects an access violation, it may provide an access fault indication to the microprocessor. In any case, typically a predetermined value, such as "zero," will be loaded into the register to be loaded and the microprocessor will continue processing the program as if the access violation had not been detected. (A load instruction processed in connection with the "no-fault" facility will be generally referred to herein as a "no-fault load instruction." A no-fault load instruction may comprise an explicit type of instruction specified by the microprocessor's architecture. Alternatively, a no-fault load instruction may be implicitly indicated by one or more elements of a conventional load instruction, as is the case in connection with a microprocessor constructed in accordance with the SPARC Version 9 architecture, by the microprocessor's processing state at the time the load instruction is processed, or by other mechanisms.)

The benefit of a no-fault load instruction will be appreciated from the following. Consider the following Code Segment A:

| | Code Segment A | |
|---|---|---|
| (1) | comp p, "invalid" | ; verify that "p" is a valid address |
| (2) | jne "label" | ; jump to "label" if "p" is not a valid address |
| (3) | ld [p],T | ; load contents of location "p" into register T |
| (4) | comp T,"a" | ; compare contents of "T" to value "a" |
| (5) | jne "label2" | ; jump to "label2" if contents of "T" do not equal "a" |
| (6) | <misc code> | ; |
| (7) | label <misc code> | ; |
| (8) | label2 <misc code> | ; |

Code Segment A includes, in line (3), a conventional load instruction, that is, a load instruction which is not a no-fault load instruction. In processing of Code Segment A, the microprocessor will first determine whether address "p" is a valid address (line (1)), in the process determining, for example, that the address is within the range of addresses which the program can access. If the microprocessor makes a negative determination during processing of line (1), it will jump (line 2) to code represented by line (7). The code represented in line 7 may comprise additional portions of the program which may be processed if an access fault is detected. Alternatively, the code represented in line (7) may comprise an error handler which is provided by the program which includes Code Segment A to perform selected error recovery operations, such as, for example, determining why "p" was determined to be an invalid address, if possible providing a valid address and resuming processing at line (1), or alternatively terminating processing in a well-behaved manner. On the other hand, if the microprocessor determines in line (1) that "p" is a valid address, it will sequence to line (3) to initiate a load operation to load the data contained in the location identified by address "p" into one of its internal registers, namely register "T." After the load has completed, the microprocessor will compare the contents of register "T" to a value "a" (line 4). If the microprocessor determines in line 4 that the contents of register "T" do not correspond to value "a," it will jump (line 5) to code beginning at line (8). On the other hand, if the microprocessor determines in line 4 that the contents of register "T" correspond to value "a," it will process miscellaneous code represented by line (6).

One problem with the code in Code Segment A is that the load instruction in line (3) may take some time to complete, in which case the microprocessor may be delayed in sequencing to line 4. However, if a conventional load instruction is processed with an invalid address, as described above the operating system's fault handler will be called, which may abruptly terminate of the program containing Code Segment A. To avoid the calling of the operating system's fault handler, the Code Segment A contains the comparison in line (1) and the code represented at line (7).

With a no-fault load instruction, the code in Code Segment A can be rearranged to move the load in line (4) ahead of the compare instruction in line (1), as shown in Code Segment B:

| | Code Segment B | |
|---|---|---|
| (1) | ld_nf [p], T | ; no-fault load contents of location "p" into register T |
| (2) | comp p, "invalid" | ; |
| (3) | jne "label" | ; |
| (4) | comp T,"a" | ; |
| (5) | jne "label2" | ; |
| (6) | <misc code> | ; |
| (7) | label <misc code> | ; |
| (8) | label2 <misc code> | ; |

A benefit of the no-fault load instruction in Code Segment B is that the microprocessor can initiate processing of the load instruction at the beginning of the code segment, several instructions ahead of the comparison in line (4). Since access faults will not be indicated during processing of a no-fault load instruction, if the address "p" is not a valid address the operating system's fault handler will not be called during processing of the no-fault load instruction. However, the microprocessor can verify that the address "p" is a valid address using the comparison on line (2) and if not process the code represented by line (7), which, as described above in connection with Code Segment A, be an error handler which is provided by the program which includes Code Segment B. On the other hand, if the microprocessor determines that the address "p" used in the no-fault load instruction is a valid address, the data should be present in register T earlier in Code Segment B than in Code Segment A, and so the microprocessor should be able to perform the comparison earlier in Code Segment B than in Code Segment A.

One problem that arises with a no-fault load instruction will be described in connection with Code Segment C, as follow:

| | Code Segment C | |
|---|---|---|
| (1) | ld_nf [p], T | ; no-fault load contents of location "p" into register T |
| (2) | comp p, "invalid" | ; |
| (3) | jne "label" | ; |
| (4) | <misc code> | ; |
| (5) | comp T, "a" | ; |
| (6) | jne "label2" | ; |
| (7) | <misc code> | ; |
| (8) | label <misc code> | ; |
| (9) | label2 <misc code> | ; |

Code Segment C is similar to Code Segment B, except that it includes an additional line (4) that represents "miscellaneous" code to be processed prior to the comparison of the contents of register "T" and value "a" (line 5). If, during processing of the "miscellaneous code" represented by line 4, the microprocessor were to store another value in register "T," before the value that is loaded during processing of the no fault load instruction is used, then the register "T" will contain an appropriate value for the comparison in line (5) regardless of whether the address "p" used in the no-fault load instruction (line 1) was a valid address. In such a case, the verification (line 2) that the address "p" is a valid address would not be necessary, and the microprocessor would not need to process the error handler code represented by line (8) if address "p" was determined not to be a valid address.

SUMMARY OF THE INVENTION

The invention provides a new and improved system and method for processing a no-fault load instruction including an arrangement for preserving access fault indicia for later use, for example, in controlling the calling of a fault handler, if the information that was to be retrieved in response to the no-fault load instruction is to be later used in processing of a subsequent instruction.

In brief summary, the invention provides, for example, a microprocessor for use in a computer system. The microprocessor processes an instruction stream comprising instructions of a plurality of instruction types including an information retrieval instruction type. The microprocessor comprises a register set, a pending fault flag set, a functional unit, an information retrieval subsystem, and a control subsystem. The register set comprises a plurality of registers, each register for storing information. The pending fault flag set comprises a plurality of pending fault flags each associated with one of the registers, each pending fault flag having selected conditions including a pending fault condition and a no pending fault condition. The functional unit performs processing operations in response to information input thereto. The information retrieval subsystem initiates an information retrieval operation to retrieve information from the information storage subsystem for storage in a register.

The control subsystem controls the other elements of the microprocessor in response to the instructions in the instruction stream. In response to an instruction in the instruction stream of the information retrieval type, the control subsystem enables the information retrieval subsystem to initiate an information retrieval operation, and conditions the pending fault flag associated with the one of the registers to the pending fault condition in response to detection of a fault condition during the information retrieval operation.

On the other hand, in response to an instruction in the instruction stream of another type, the control subsystem identifies a selected one of the registers as a source register, and, if the pending fault flag is in the pending fault condition, the control subsystem calls a fault handler to process the fault. However, if the pending fault flag associated with the source register is in the no pending fault condition, the control subsystem enables (i) information to be transferred from the source register to the functional unit for processing, (ii) the processed data generated by the functional unit to be stored in a selected one of said registers as a destination register, and (ii) the pending fault flag associated with the destination register to be conditioned to the no pending fault condition.

Accordingly, if a register, while its pending fault flag is in the pending fault condition, is to be used as a source register, the fault handler will be called. On the other hand, if the information in the register is overwritten, resulting in a change in the condition of the pending flag to the no pending fault condition, before the register is identified as a source register, the pending fault condition will be ignored. Thus, the fault handler will be called only if the register is used as a source register for the information which gave rise to the fault condition, not every time the fault condition is encountered, which can result in enhanced processing efficiency. In addition, the likelihood that the program including the instruction stream will be terminated, which may occur if the fault handler determines that a fault condition cannot be corrected, will be reduced.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
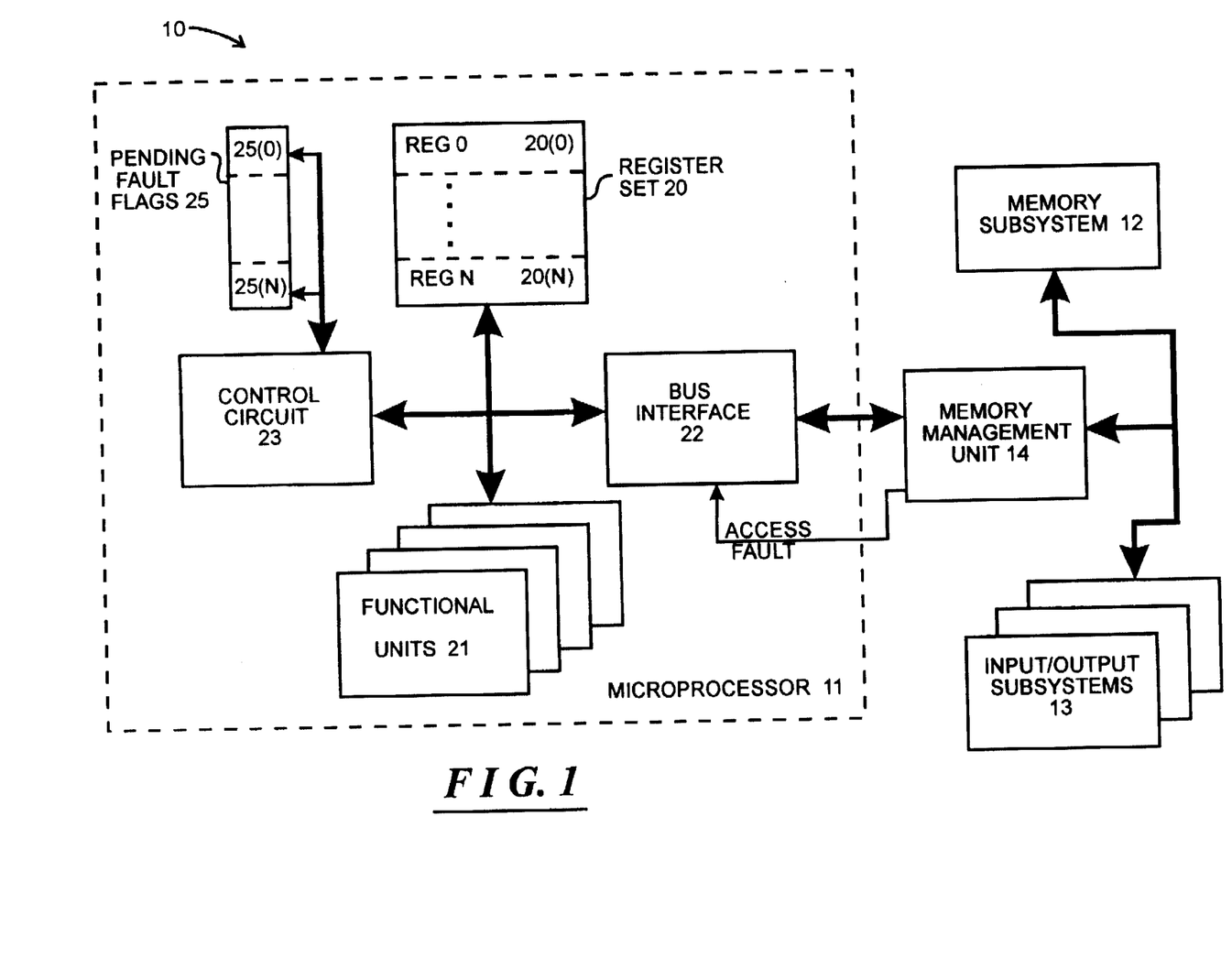
FIG. 1 is a functional block diagram depicting a digital computer system constructed in accordance with the invention.

FIG. 1 is a functional block diagram of a digital computer system 10 constructed in accordance with the invention. With reference to FIG. 1, the digital computer system 10 includes a microprocessor 11 which communicates with a memory subsystem 12 and one or more input/output subsystems generally identified by reference numeral 13 through a memory management unit 14. The microprocessor 11 processes programs, including an operating system and one or more application programs all of which comprise instructions, in accordance with data, with the instructions and data (which collectively will be referred to herein as "information") being stored in the memory subsystem 12. Typically, the microprocessor 11 will retrieve instructions and data from the memory subsystem 12 for processing, and will store processed data in the memory subsystem 12. The memory subsystem 12 includes a number of addressable storage locations in which information to be processed by the microprocessor 11 may be stored, and in which the microprocessor 11 may store the processed data.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mice devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective virtual address space pages may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program is authorized to perform the particular access operation, and whether or not the requested page is a valid page in the virtual address space, and the like. If the memory management unit 14 makes a negative determination in the checking operation, that is, if it determines, for example, that the page is not in the memory subsystem 12, that the application program is not authorized to perform the particular access operation, or if it determines that the requested page of the virtual address space page is not a valid page in the application program's virtual address space, it may generate an ACCESS FAULT indication, which the microprocessor 11 may receive and use in performing selected fault handling operations.

In one embodiment, a microprocessor 11 useful in system 10 comprises a microprocessor constructed in accordance with the SPARC Version 9 architecture described in the SPARC Architecture Manual, Version 9. The microprocessor 11 generally includes a number of elements, including a register set 20, one or more functional units 21, a bus interface 22 and a control circuit 23. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage.

The control circuit 23 controls the processing operations as performed by the microprocessor 11 in response to the instructions, as described above. The instructions control the loading of data retrieved from the memory subsystem 12 in the register set 20, the operations performed by the functional units 21 and the storage of data from the register set 20 in the memory subsystem 12. The register set 20 includes a plurality of registers 20(0) through 20(N) (generally identified by reference numeral 20(n)) each of which can store data received from the memory subsystem 12 and/or input/output subsystems 13. To initiate processing of data stored in the memory subsystem 12 or an input/output subsystem 13, the control circuit 23

(1) in a "load" operation, enables the bus interface 22 and memory management unit 14 to transfer the data to one or more registers 20(n) in register set 20 as a "destination" register;

(2) in a "processing" operation (i) enables data from one or more of the registers 20(n), as "source" registers, to be transferred to a functional unit 21 for processing, (ii) controls the functional unit 21 to perform a selected processing operation, and (iii) enables the processed data from the function unit 21 to be stored in a selected "destination" register 20(n); and (3) in a "store" operation, enables the bus interface 22 and memory management unit 14 to transfer processed data from one or more selected register(s) 20(n), as "source" registers, to the memory subsystem 12 or an input/output subsystem 13 for storage.

In one embodiment, which is typical of a microprocessor 11 constructed along a load/store "RISC" (reduced instruction set computer) architectural model, such as the model described in the aforementioned "The SPARC Architecture Manual, Version 9," each of the operations identified in items (1), (2) and (3) above, is controlled by a separate program instruction. That is, a program will have "load" instructions for initiating load operations (item (1) above), "processing" instructions (such as arithmetic, floating point, logical, control flow and other instructions in which data is processed) for initiating processing operations (item (2) above), and "store" instructions for initiating store operations (item (3) above). A load instruction will typically include such information as the virtual address of the virtual addressable storage location which contains the data to be loaded and the identification of the register 20(n) into which the data is to be loaded. A processing instruction will typically identify the processing operation to be performed and, if it requires data from source and destination registers, identifiers for the source and destination registers. A store instruction will typically include such information as the identification of the register 20(n) which contains the data to be stored and the virtual address of the virtual addressable storage location into which the data is to be stored. For both a load instruction and a store instruction, the virtual address may comprise part of the instruction, or it may be stored in a register 20(n) which may be identified as a source register in the instruction.

In that same embodiment, microprocessor 11 provides a facility for processing no-fault load instructions. As described above, the memory management unit 14 will perform certain checking operations in connection with an access operation, including retrieval operations which are used in connection with load instructions and generates access fault indications in response to selected conditions during the access operation. During processing of a conventional load instruction (that is, a load instruction which is not a no-fault load instruction), if the control circuit 23 determines that an access fault indication has been generated, a fault handler will at that point be called to perform selected fault recovery operations and/or enable processing of the program to be terminated.

On the other hand, if, during processing of a no-fault load instruction, an access fault indication is generated, the control circuit 23 will not at that point call the fault handler. In accordance with the invention, the microprocessor 11 further includes an arrangement, including a pending fault register 25, for preserving access fault indicia which the control circuit 23 may later use if a subsequent instruction is to use the destination register for the no-fault load instruction as a source register. The pending fault register 25 comprises a number of pending fault flags 25(0) through 25(N) (generally identified by reference numeral 25(n)) each of which is associated with a correspondingly-indexed register 20(n) and provides access fault indicia with respect to the correspondingly-indexed register 20(n). Each pending fault flag 25(n) may be controlled by the control circuit 23 to indicate the status of the correspondingly-indexed register 20(n), in particular to indicate whether there is a pending access fault for the register 20(n), that is, whether the most recent instruction which used the register 20(n) as a destination register was a no-fault load instruction for which an access fault indication had been generated. If a register 20(n) is identified as a source register in, for example, a processing or store instruction, the control circuit 23 may use the pending fault flag 25(n) to control calling of a fault handler. In particular, if the pending fault flag indicates that there is a pending access fault in connection with the register 20(n), the control circuit 23 may call the fault handler to process the pending access fault. On the other hand, if the pending fault flag indicates that there is no pending access fault in connection with the register 20(n), the control circuit 23 may proceed to processing of the instruction which identified the register 20(n) as a source register.

More specifically, the pending fault flags 25(n) are initially conditioned to the clear condition, and will be conditioned by the control circuit 23 during processing of a no-fault load instruction based on whether an access fault indication is generated during processing of a no-fault load instruction. That is, if the control circuit 23 determines that an access fault indication is generated during processing of a no-fault load instruction for which a register 20(n) is the destination register, it (the control circuit 23) will set the pending fault flag 25(n) associated with the destination register to indicate that a pending fault condition exists for the destination register. In addition, in one embodiment, the control circuit 23 will also load additional access fault indicia in the register 20(n), in particular the virtual address provided by the no-fault load instruction which resulted in the access fault indication, which may be useful during processing of the fault handler if it is later called. On the other hand, if the control circuit 23 determines that an access fault indication is not generated during processing of a no-fault load instruction for which the register 20(n) is the destination register, or if the register 20(n) is used as the destination register for other types of instructions, it (the control circuit 23) will clear the assorted pending fault flag 25(n), or it will maintain the associated pending fault flag 25(n) in a clear condition if the flag 25(n) is already clear.

In connection with processing of each, for example, processing or store instruction which uses data in one or more registers 20(n) as respective source registers, the control circuit 23 will use the pending fault flags 25(n) in pending fault register 25 to determine whether a pending fault condition exists in connection with the registers 20(n), to control whether it is to continue processing of the instruction or call a fault handler for the pending fault condition. Thus, if the control circuit determines that the pending fault flag(s) 25(n) associated with the source register(s) identified in an instruction indicates that a pending fault condition does not exist for any of the source registers, the control circuit 23 can proceed to process the instruction. On the other hand, if the control circuit 23 determines that, for a register 20(n) identified as a source register in an instruction, the associated pending fault flag 25(n) is set, indicating that a pending fault condition exists, it (the control circuit 23) will enable the microprocessor 11 to sequence to processing of a fault handler as described above to process the fault for the register 20(n). It will be appreciated that, if an instruction requires multiple source registers, and if pending fault flags 25(n) associated more than one of the source registers indicate a pending fault condition, the control circuit 23 may enable the fault handler to process the fault for all of the source registers for which a pending fault condition exists.

Accordingly, the microprocessor 11 will not call the fault handler until a register 20(n), which was loaded during processing of a no-fault load instruction during which an access fault indication was generated, is actually used as a source register in processing of a subsequent instruction. Thus, if the contents of such a register 20(n) (that is, a register was loaded during processing of a no-fault load instruction during which an access fault was indicated) are overwritten during processing of a subsequent instruction before the register 20(n) is used as a source register, the fault handler need not be called. This may occur if, for example, the register 20(n) is used as the destination register for a subsequent processing instruction or a subsequent load or a no-fault load instruction for which no access fault indication was generated. In such a case, the subsequent instruction will load the destination register with valid data, in which case the fact that an access fault occurred during processing of the previous no-fault load instruction can be ignored. As noted above, the control circuit 23, during processing of the subsequent instruction, will clear the pending fault flag 25(n) associated with the destination register, in which case the pending fault condition will no longer exist with respect to the destination register. Since the fault handler will not be called to process an access fault unless the register 20(n) is identified as a source register while a pending fault condition exists (that is, while the associated pending fault flag 25(n) is set), processing efficiency can be improved and unnecessary program termination may be avoided.

Figure 2:
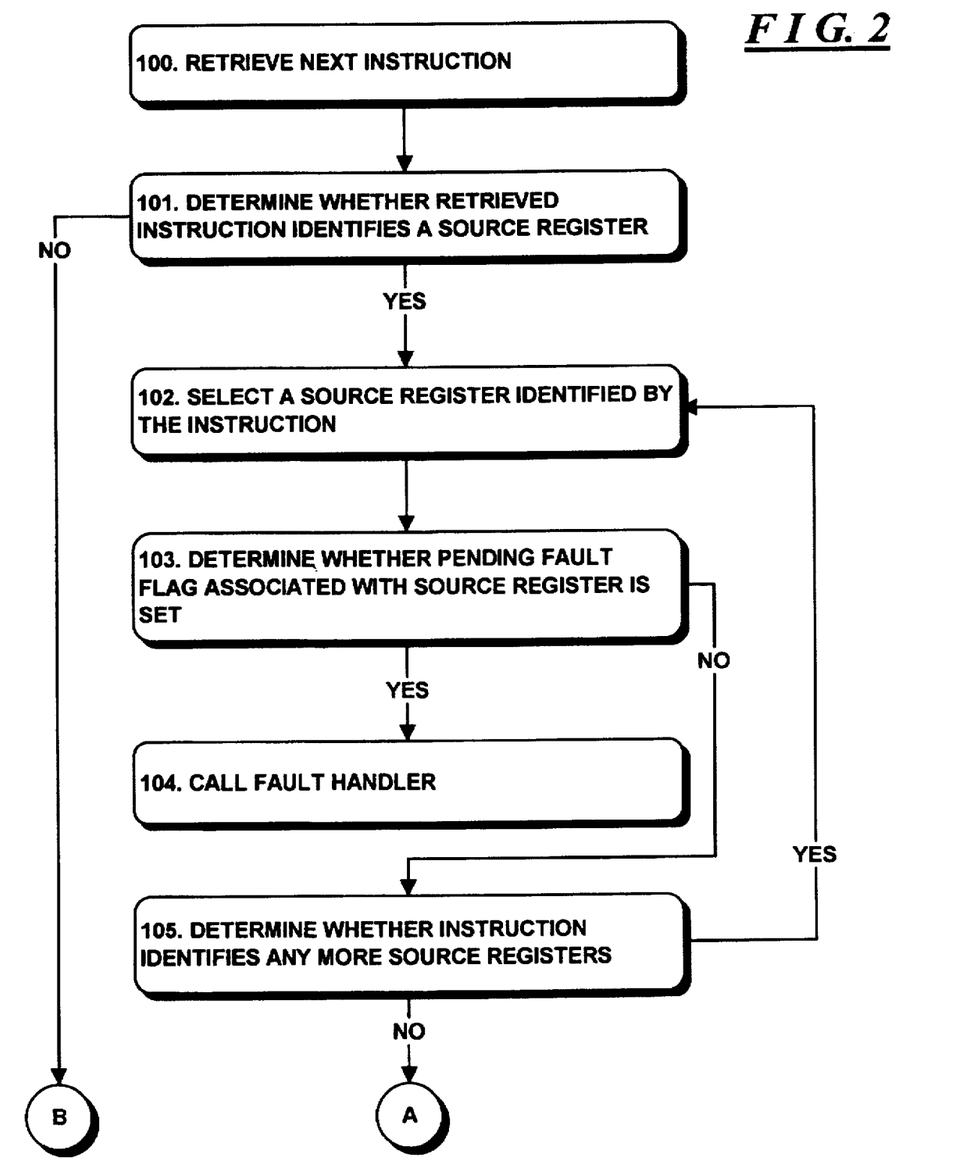
FIG. 2 is a flow chart depicting operations performed by the digital computer system in connection with the invention.

With this background, the operations performed by the microprocessor 11 in connection with processing of an instruction will be described in connection with the flow-chart FIG. 2. With reference to FIG. 2, the control circuit 23 initially enables an instruction to be retrieved for processing (step 100). After receiving the instruction, the control circuit 23 will decode the instruction and determines whether it makes use of a register 20(n) in register set 20 as a source register for the instruction (step 101), and if so it sequence to a series of steps 102 through 105 to determine, for each register 20(n) identified as a source register, whether a pending fault condition exists for the source register. In that operation, the control circuit 23 will initially select a source register identified in the instruction (step 102) and determine whether the pending fault flag 25(n) associated with the selected source register is set (step 103). As described above, if the pending fault flag 25(n) is set, a pending fault condition exists for the register, and so, if the control circuit 23 makes a positive determination in step 103, it will sequences to step 104 to call a fault handler to process the pending access fault.

Returning to step 103, if the control circuit 23 makes a negative determination in that step, no pending fault condition exists for the selected source register (that is, the source register that was selected in step 102) was last used as a destination register for a previous instruction. In that case, the control circuit 23 sequences to step 105 to determine whether the instruction has any additional source registers and, if so, it returns to step 102 to select another source register and perform the operations described above in connection with steps 102 through 104 in connection therewith. These operations will be repeated for each of the source registers identified in the instruction until the control circuit 105 determines in step 105 that steps 102 through 104 have been performed in connection with all of the source registers identified in the instruction, at which point it will sequence to step 106. It will be appreciated that the control circuit 23 can perform the operations described above in connection with steps 102 through 105 in a series of iterations, in each iteration performing steps 102 through 105 for each of the source registers; alternatively it (the control circuit 23) may perform the operations described in connection with steps 102 through 104 for the source registers in parallel, in which case step 107 may be omitted.

Returning to step 101, if the control circuit 23 determines in that step 101 that the instruction retrieved in step 100 did not identify any source registers, it will sequence directly to step 106.

In step 106, the control circuit 23 enables the operation specified in the instruction to be executed. The particular operations performed during execution of the instruction depend on the instruction to be processed, and will not be described in detail herein. In any case, if the instruction identifies any source registers, their contents will be used in processing of the instruction. In addition, the destination register (if any) may be loaded with, for example, processed data that is generated (if the instruction is a processing instruction) or data retrieved from the memory subsystem 12 or an input/output subsystem 13.

Following the processing operations performed in connection with step 106, the control circuit 23 will determine whether an access fault indication was generated (step 107). If so, if the instruction was a no-fault load instruction (step 108), the control circuit 23 will set the pending fault flag 25(n) assorted with the destination register to indicate that a pending fault condition exists for the register, and it may also load access fault indicia, such as the virtual address that was used which resulted in the pending fault condition, into the destination register. It will be appreciated that, if the destination register 20(n) is later used as a source register in connection with a subsequent instruction, the fault handler may be called in step 104 during processing of the subsequent instruction. On the other hand, if the instruction was not a no-fault load instruction (reference step 108), the control circuit 23 will at that point sequence to step 110 to call the fault handler to process the access fault.

Returning to step 111, if the control circuit determines in that step that no access fault occurred during processing of the instruction, it will sequence to step 115 to clear the pending fault flag 25(n) associated with the destination register. Thus, regardless of whether the pending fault flag 24(n) associated with the destination register 20(n) was set at the beginning of the operations depicted in FIG. 2, since pending fault flag 25(n) associated with the destination register is not set, no pending fault condition exists and the fault handler will not be called during processing of a subsequent instruction (reference step 104) which uses the destination register is used as a source register.

The invention provides a number of advantages. In particular, it allows for the use of no-fault load instructions, while preserving indicia indicating as to whether an access fault indication was generated during processing of the no-fault load instructions. In addition, the invention may further allow saving of information (illustratively the virtual address which gave rise to the access fault), which can be later used by a fault handler which may be called to process the fault condition. In addition, the fault handler will be called to process an access fault generated for a particular register 20(n) only if the information in the register is used as a source register for a subsequent instruction. Accordingly, if the contents of the register (that is, the register used as the destination register for a no-fault load instruction which resulted in an access fault) are overwritten during processing of a subsequent load, no-fault load or processing instruction, which may occur if the register is the destination register for the subsequent instruction, and if no access fault occurs during processing of the subsequent instruction, the prior access fault in connection with that register will be ignored, which can result in enhance processing efficiency.

It will be appreciated that a number of variations and modifications may be made to the embodiment described above in connection with FIGS. 1 and 2. For example, while the microprocessor 11 and memory management unit 14 have been depicted in FIG. 1 as comprising separate elements, with the memory management unit 14 communicating with the microprocessor through the bus interface 22, it will be appreciated that the microprocessor 11 and memory management unit 14 may comprise a single element integrated together on one or more integrated circuit chips. If the microprocessor 11 and memory management unit 14 are integrated together, the bus interface 22 and memory management unit 14 may, for example, be unified into a single element.

In addition, although the pending fault register 25 is depicted in FIG. 1 as comprising an element of the microprocessor 11, it will be appreciated that the register 25 may actually be located anywhere in system 10, and in particular the register 25 may be in a storage location in memory subsystem 12. In that connection, it will be appreciated that the no-fault instruction processing facility in accordance with the invention may be emulated by the microprocessor. Indeed, the entire microprocessor 11, constructed in accordance with a selected architecture (such as the aforementioned SPARC, Version 9, architecture as described in the aforementioned SPARC Architecture Manual, Version 9) further including the no-fault instruction processing facility in accordance with the invention, may be emulated using a microprocessor of, for example, another architecture as provided with suitable emulation programs or microcode.

Furthermore, it will be appreciated that a microprocessor 11 including a no-fault instruction processing facility in accordance with the invention can be constructed in whole or in part from special purpose hardware or one or more program-controllable devices which any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A microprocessor for connection to an information storage subsystem in a computer system, the microprocessor processing an instruction stream comprising instructions of a plurality of instruction types including an information retrieval instruction type, the microprocessor comprising:

A. a register set comprising a plurality of registers, each register for storing information;
   B. a pending fault flag set comprising a plurality of pending fault flags each associated with one of said registers, each pending fault flag having selected conditions including a pending fault condition and a no pending fault condition;
   C. a functional unit for performing a processing operation in response to information input thereto;
   D. an information retrieval subsystem for initiating an information retrieval operation to retrieve information from said information storage subsystem for storage in one of said registers; and
   E. a control subsystem for:
      i. in response to an instruction in the instruction stream of the information retrieval type, enabling said information retrieval subsystem to initiate an information retrieval operation, the control subsystem conditioning the pending fault flag associated with said one of said registers to the pending fault condition in response to detection of a fault condition during the information retrieval operation; and
      ii. in response to an instruction in the instruction stream of another type identifying a selected one of said registers as a source register, enabling information to be transferred from said source register to the functional unit for processing if the pending fault flag associated with said source register is in the no pending fault condition.

2. A microprocessor as defined in claim 1 in which the control subsystem, in response to detection of a fault condition during the information retrieval operation, further stores fault identifying indicia in said one of said registers.

3. A microprocessor as defined in claim 2 in which each said information retrieval operation includes an information identifier for identifying the information to be retrieved during the information retrieval operation, the fault identifying information comprising the information identifier.

4. A microprocessor as defined in claim 1 in which the control subsystem, in response to an instruction in the instruction stream of another type identifying a selected one of said registers as a source register, alternatively initiates processing of a fault handler if the pending fault flag associated with said source register is in the pending fault condition.

5. A microprocessor as defined in claim 1 in which the functional unit during one of said processing operations generates processed information in response to the information input thereto, the control subsystem enabling the processed information to be stored in a selected one of said registers as a destination register.

6. A microprocessor as defined in claim 5 in which the control subsystem, in addition to enabling the processed information to be stored in the destination register, further conditions the pending fault flag associated with the destination register to the no pending fault condition.

7. A method as defined in claim 6 in which processed information is generated in response to an instruction in the instruction stream of another type, the processed information being stored in a selected one of said registers as a destination register.

8. A method as defined in claim 7 in which, in addition to storing processed information in the destination register, the pending fault flag associated with the destination register is conditioned to the no pending fault condition.

9. A method of controlling a microprocessor for connection to an information storage subsystem in a computer system, the microprocessor processing an instruction stream comprising instructions of a plurality of instruction types including an information retrieval instruction type, the method comprising the steps of:

A. in response to an instruction in the instruction stream of the information retrieval type, initiating an information retrieval operation to retrieve information from said information storage subsystem for storage in one of a plurality of registers, and conditioning a pending fault flag associated with said one of said registers to a pending fault condition in response to detection of a fault condition during the information retrieval operation; and
   B. in response to an instruction in the instruction stream of another type identifying a selected one of said registers as a source register, processing information from said source register if the pending fault flag associated with said source register is in the no pending fault condition.

10. A method as defined in claim 9 in which, in response to an instruction in the instruction stream of another type identifying a selected one of said registers as a source register, a fault handler is processed if the pending fault flag associated with said source register is in the pending fault condition.

11. A method as defined in claim 9 in which, in response to detection of a fault condition during the information retrieval operation, fault identifying indicia is stored in said one of said registers.

12. A method as defined in claim 11 in which each said information retrieval operation includes an information identifier for identifying the information to be retrieved during the information retrieval operation, the fault identifying information comprising the information identifier.

13. A computer program product for use in connection with a computer system, the computer system comprising a microprocessor for connection to an information storage subsystem in a computer system, the computer program product enabling the microprocessor to process an instruction stream comprising instructions of a plurality of instruction types including an information retrieval instruction type, the computer program product comprising a computer usable medium having computer system readable code embodied therein, the computer system readable code comprising:

A. register set code devices for enabling said microprocessor to establish a plurality of registers, each register for storing information;

B. pending fault flag set code devices for enabling said microprocessor to establish a pending fault flag set comprising a plurality of pending fault flags each associated with one of said registers, each pending fault flag having selected conditions including a pending fault condition and a no pending fault condition;

C. functional unit code devices for enabling the microprocessor to perform a processing operation in response to information input thereto;

D. information retrieval subsystem code devices for enabling said microprocessor to initiate an information retrieval operation to retrieve information from said information storage subsystem for storage in one of said registers; and E. control subsystem code devices for enabling said microprocessor to:
  i. in response to an instruction in the instruction stream of the information retrieval type, enable said microprocessor to use the information retrieval subsystem code devices to initiate an information retrieval operation, the control subsystem code devices enabling the microprocessor to conditioning the pending fault flag associated with said one of said registers to the pending fault condition in response to detection of a fault condition during the information retrieval operation; and
  ii. in response to an instruction in the instruction stream of another type identifying a selected one of said registers as a source register, enabling information to be transferred from said source register for processing using the functional unit code devices if the pending fault flag associated with said source register is in the no pending fault condition.

14. A computer program product as defined in claim 13 in which the control subsystem code devices enable the microprocessor to, in response to detection of a fault condition during the information retrieval operation, further store fault identifying indicia in said one of said registers.

15. A computer program product as defined in claim 14 in which each said information retrieval operation includes an information identifier for identifying the information to be retrieved during the information retrieval operation, the fault identifying information comprising the information identifier.

16. A computer program product as defined in claim 13 in which the control subsystem code devices enable the microprocessor to, in response to an instruction in the instruction stream of another type identifying a selected one of said registers as a source register, alternatively initiate processing of a fault handler if the pending fault flag associated with said source register is in the pending fault condition.

17. A computer program product as defined in claim 13 in which the functional unit code devices enable the microprocessor to, during one of said processing operations, generate processed information in response to the information input thereto, the control subsystem code devices enabling the microprocessor to store the processed information in a selected one of said registers as a destination register.

18. A computer program product as defined in claim 17 in which the control subsystem code devices, in addition to enabling microprocessor to store the processed information in the destination register, further enables the microprocessor to condition the pending fault flag associated with the destination register to the no pending fault condition.

19. A microprocessor for connection to an information storage subsystem in a computer system, the microprocessor processing an instruction stream comprising instructions of a plurality of instruction types including an information retrieval instruction type, the microprocessor comprising:

A. a register set comprising a plurality of registers, each register for storing information;

B. a functional unit for performing a processing operation in response to information input thereto;

C. an information retrieval subsystem for initiating an information retrieval operation to retrieve information from said information storage subsystem for storage in one of said registers; and D. a control subsystem including:
  i. a pending fault flag establishment element for establishing a plurality of pending fault flags each associated with one of said registers, each pending fault flag having selected conditions including a pending fault condition and a no pending fault condition;
  ii. an information retrieval instruction control element for, in response to an instruction in the instruction stream of the information retrieval type, enabling said information retrieval subsystem to initiate an information retrieval operation, and for conditioning the pending fault flag associated with said one of said registers to the pending fault condition in response to detection of a fault condition during the information retrieval operation; and
  iii. a non-information-retrieval-instruction control element for, in response to an instruction in the instruction stream of another type identifying a selected one of said registers as a source register, enabling information to be transferred from said source register to the functional unit for processing if the pending fault flag associated with said source register is in the no pending fault condition.

20. A microprocessor as defined in claim 19 in which the information retrieval instruction control element, in response to detection of a fault condition during the information retrieval operation, further stores fault identifying indicia in said one of said registers.

21. A microprocessor as defined in claim 20 in which each said information retrieval operation includes an information identifier for identifying the information to be retrieved during the information retrieval operation, the fault identifying information comprising the information identifier.

22. A microprocessor as defined in claim 19 in which the non-information-retrieval-instruction control element, in response to an instruction in the instruction stream of another type identifying a selected one of said registers as a source register, alternatively initiates processing of a fault handler if the pending fault flag associated with said source register is in the pending fault condition.

23. A microprocessor as defined in claim 19 in which the functional unit during one of said processing operations generates processed information in response to the information input thereto, the non-information-retrieval-instruction control element enabling the processed information to be stored in a selected one of said registers as a destination register.

24. A microprocessor as defined in claim 23 in which the non-information-retrieval-instruction control element, in addition to enabling the processed information to be stored in the destination register, further conditions the pending fault flag associated with the destination register to the no pending fault condition.

25. A control subsystem for controlling a microprocessor, the microprocessor being for connection to an information storage subsystem in a computer system, the microprocessor processing an instruction stream comprising instructions of a plurality of instruction types including an information retrieval instruction type, the microprocessor comprising a register set comprising a plurality of registers, each register for storing information, a functional unit for performing a processing operation in response to information input thereto, and an information retrieval subsystem for initiating an information retrieval operation to retrieve information from said information storage subsystem for storage in one of said registers, the control subsystem including:

i. a pending fault flag establishment element for establishing a plurality of pending fault flags each associated with one of said registers, each pending fault flag having selected conditions including a pending fault condition and a no pending fault condition;

ii. an information retrieval instruction control element for, in response to an instruction in the instruction stream of the information retrieval type, enabling said information retrieval subsystem to initiate an information retrieval operation, and for conditioning the pending fault flag associated with said one of said registers to the pending fault condition in response to detection of a fault condition during the information retrieval operation; and iii. a non-information-retrieval-instruction control element for, in response to an instruction in the instruction stream of another type identifying a selected one of said registers as a source register, enabling information to be transferred from said source register to the functional unit for processing if the pending fault flag associated with said source register is in the no pending fault condition.

26. A control subsystem as defined in claim 25 in which the information retrieval instruction control element, in response to detection of a fault condition during the information retrieval operation, further stores fault identifying indicia in said one of said registers.

27. A control subsystem as defined in claim 26 in which each said information retrieval operation includes an information identifier for identifying the information to be retrieved during the information retrieval operation, the fault identifying information comprising the information identifier.

28. A control subsystem as defined in claim 25 in which the non-information-retrieval-instruction control element, in response to an instruction in the instruction stream of another type identifying a selected one of said registers as a source register, alternatively initiates processing of a fault handler if the pending fault flag associated with said source register is in the pending fault condition.

29. A control subsystem as defined in claim 25 in which the functional unit during one of said processing operations generates processed information in response to the information input thereto, the non-information-retrieval-instruction control element enabling the processed information to be stored in a selected one of said registers as a destination register.

30. A control subsystem as defined in claim 29 in which the non-information-retrieval-instruction control element, in addition to enabling the processed information to be stored in the destination register, further conditions the pending fault flag associated with the destination register to the no pending fault condition.

31. An information handling system for connection to an information storage subsystem, the information handling system comprising:

A. a register set comprising a plurality of registers, each register for storing information;

B. a pending fault flag set comprising a plurality of pending fault flags each associated with one of said registers, each pending fault flag having selected conditions including a pending fault condition and a no pending fault condition; and C. an information retrieval subsystem responsive to an instruction of an information retrieval type for initiating an information retrieval operation to retrieve of information from said information storage subsystem for storage in one of said registers, the information retrieval subsystem conditioning the pending fault flag associated with said one of said registers to the pending fault condition in response to detection of a fault condition during the information retrieval operation.

32. An information handling method comprising the steps of:

A. in response to an instruction of an information retrieval type, initiating an information retrieval operation to retrieve information from an information storage subsystem for storage in one of a plurality of registers; and B. conditioning a pending fault flag associated with said one of said registers to the pending fault condition in response to detection of a fault condition during the information retrieval operation.

* * * * *